United States Patent
Kitano et al.

(10) Patent No.: US 9,285,042 B2
(45) Date of Patent: Mar. 15, 2016

(54) DIAPHRAGM VALVE AND SEAT HOLDER UNIT FOR DIAPHRAGM VALVE

(71) Applicant: FUJIKIN INCORPORATED, Osaka-shi (JP)

(72) Inventors: Taichi Kitano, Osaka (JP); Tsutomu Shinohara, Osaka (JP); Michio Yamaji, Osaka (JP); Ryutaro Nishimura, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/130,064

(22) PCT Filed: Nov. 27, 2012

(86) PCT No.: PCT/JP2012/080535
§ 371 (c)(1),
(2) Date: Dec. 30, 2013

(87) PCT Pub. No.: WO2013/084743
PCT Pub. Date: Jun. 13, 2013

(65) Prior Publication Data
US 2014/0319403 A1  Oct. 30, 2014

(30) Foreign Application Priority Data
Dec. 5, 2011  (JP) .................................. 2011-265392

(51) Int. Cl.
*F16K 7/16* (2006.01)
*F16K 7/14* (2006.01)

(52) U.S. Cl.
CPC .... *F16K 7/16* (2013.01); *F16K 7/14* (2013.01)

(58) Field of Classification Search
CPC ......... F16K 7/12; F16K 7/14; F16K 27/0236; F16K 25/005; F16K 7/17; F16K 7/123–7/126; F16K 7/16
USPC ........................ 251/331, 335.2, 359–363, 368
See application file for complete search history.

(56) References Cited

U.S. PATENT DOCUMENTS

| | | | | |
|---|---|---|---|---|
| 4,828,219 | A | * | 5/1989 | Ohmi et al. .................... 251/118 |
| 5,215,286 | A | * | 6/1993 | Kolenc ........................... 251/331 |
| 5,340,170 | A | * | 8/1994 | Shinohara et al. ............ 285/379 |
| 5,366,261 | A | * | 11/1994 | Ohmi et al. .................... 285/328 |

(Continued)

FOREIGN PATENT DOCUMENTS

| | | |
|---|---|---|
| JP | 06-193747 A | 7/1994 |
| JP | 6-341560 A | 12/1994 |

(Continued)

OTHER PUBLICATIONS

International Search Report mailed Mar. 12, 2013, issued for PCT/JP2012/080535.

*Primary Examiner* — John Bastianelli
(74) *Attorney, Agent, or Firm* — Locke Lord LLP

(57) ABSTRACT

A diaphragm valve and a seat holder unit for the diaphragm valve which allows easy replacement of a seat is provided. The diaphragm valve includes a retainer configured to hold a seat holder. The seat holder is demountably arranged on a body to hold a seat. The retainer has a substantially cylindrical shape and includes an inward flange portion receiving the outer peripheral edge portion of the seat holder, and is demountably mounted on the diaphragm holding members in a state of holding the seat holder.

4 Claims, 3 Drawing Sheets

(56) References Cited

U.S. PATENT DOCUMENTS

| | | | |
|---|---|---|---|
| 5,485,984 A * | 1/1996 | Itoi et al. | 251/331 |
| 5,524,865 A * | 6/1996 | Uchisawa et al. | 251/331 |
| 5,771,919 A * | 6/1998 | Itoi et al. | 137/454.6 |
| 6,073,646 A * | 6/2000 | Kimura | 251/331 |
| 6,135,155 A * | 10/2000 | Ohmi et al. | 137/884 |
| 6,786,471 B2 * | 9/2004 | Nakata et al. | 251/360 |
| 6,871,803 B1 * | 3/2005 | Ohmi et al. | 239/596 |
| 7,416,165 B2 * | 8/2008 | Ohmi et al. | 251/331 |
| 2003/0025099 A1 | 2/2003 | Nakata et al. | |
| 2011/0140014 A1 * | 6/2011 | Schmit et al. | 251/61 |

FOREIGN PATENT DOCUMENTS

| | | |
|---|---|---|
| JP | 10-026240 A | 1/1998 |
| JP | 10-332003 A | 12/1998 |
| JP | 2003-42314 A | 2/2003 |
| JP | 2003-322263 A | 11/2003 |
| JP | 2010-144765 A | 7/2010 |

* cited by examiner (a)

(b)

(a)

(b)

DIAPHRAGM VALVE AND SEAT HOLDER UNIT FOR DIAPHRAGM VALVE

TECHNICAL FIELD

The present invention relates to a diaphragm valve and a seat holder unit for a diaphragm valve and, more specifically, to a diaphragm valve in which a seat is demountably held by a seat holder and a seat holder unit used in such a diaphragm valve.

BACKGROUND ART

As a diaphragm valve, there is a known type including a body provided with a fluid channel, a seat demountably arranged in a peripheral edge of the fluid channel formed, on the body, a seat holder demountably arranged on the body and configured to hold the seat, a diaphragm configured to open and close the fluid channel by being pressed against or moved away from the seat, a diaphragm holding member configured to clamp an outer peripheral edge portion of the diaphragm with the seat holder, a vertically moving device configured to move the diaphragm holder configured to press a center portion of the diaphragm upward and downward (Patent Literature 1, and so forth).

In the diaphragm valve of the related art as described above, the seat is demountable and is held by the seat holder, and the seat itself can be replaced when having become damaged.

CITATION LIST

Patent Literature

PTL 1: JP-A-2003-42314

SUMMARY OF INVENTION

Technical Problem

In the configuration of the related art described above, when the seat holder is plastically deformed and hence cannot be demounted, there arises a problem of difficulty of seat replacement.

It is an object of the present invention to provide a diaphragm valve and a seat holder unit for the diaphragm valve which allows easy seat replacement.

Solution to Problem

A diaphragm valve of the present invention is a diaphragm valve including a body provided with a fluid channel, a seat arranged in a peripheral edge of the fluid channel formed on the body, a seat holder demountably arranged on the body and configured to hold the seat, a diaphragm configured to open and close the fluid channel by being pressed against or moved away from the seat, a diaphragm holding member configured to clamp an outer peripheral edge portion of the diaphragm with the seat holder, a vertical moving device configured to move the diaphragm holder configured to press a center portion of the diaphragm in the vertical direction, further including: a retainer configured to hold the seat holder, characterized in that the retainer is demountably mounted on the diaphragm holding member in a state of holding the seat holder.

In the diaphragm valve, a vertically moving device may be a manual valve such as an opening and closing handle, or the vertically moving device may be an automatic valve configured as an adequate actuator, and the actuator in the case of the automatic valve may be on the basis of fluid (air) pressure or on the basis of an electromagnetic force.

The term "diaphragm holding member" is a member configured to be fixed to the body and clamp the outer peripheral edge portion of the diaphragm with the seat holder, and, for example, is composed of a diaphragm holding ring formed into an annular shape and a member for fixing the same to the body. However, it is not limited thereto, and for example, a cylindrical bonnet inserted at a lower end portion thereof into a depression of the body and extending upward may be configured to serve also as a diaphragm holding member.

The retainer is, for example, provided with the inward flange portion having a substantially cylinder shape configured to receive the outer peripheral edge portion of the seat holder. However, the flange portion of any shape may be applied as long as the seat holder has a configuration not to drop out of the retainer, and a configuration having a protruding shape for holding the seat holder instead of the inward flange portion is also applicable.

The seat is preferably replaced when after having used for a long time, and in the case of replacing the seat of the diaphragm valve of the present invention, the seat holder held by the retainer and the seat held thereby may be demounted by demounting the retainer, so that the replacement of the seat (replacement of only the seat and replacement of both of the seat holder and the seat are possible) may be achieved easily. The seat holder, being configured to clamp the outer peripheral edge portion of the diaphragm, may be subjected to a plastic deformation, while the retainer, being required only to be demountably mounted on the diaphragm holding member, and has little probability of the plastic deformation, so that easiness of displacement of the seat is maintained for a long time.

Although the seat is formed of, for example, a synthetic resin, a metal is also applicable as a matter of course. The seat holder and the retainer are preferably formed of a metal.

The diaphragm is formed, for example, of a nickel alloy thin plate, and is formed into an inverted dish shape formed by being cut out into a circular shape and protruded at a center portion thereof upward. The diaphragm may be formed, for example, of a stainless steel thin plate, or a laminated body composed of a stainless steel thin plates and nickel-cobalt alloy thin plate. The material of the diaphragm is not specifically limited. In addition, the diaphragm may be a single layer, or a laminated body composed of a plurality of laminated layers, and may be selected freely depending on the specifications or conditions.

A seat holder unit for a diaphragm valve of the present invention is a seat holder unit for a diaphragm valve used in a diaphragm valve configured to open and close the fluid channel by moving a diaphragm so as to be pressed against the seat and moved away from the seat including: a seat holder configured to hold a seat arranged on a peripheral edge of a fluid channel formed in a body; and a retainer configured to hold the seat holder, characterized in that the retainer has a substantially cylindrical shape and includes an inward flange portion configured to receive an outer peripheral edge portion of the seat holder.

The seat holder is a known one and, for example, has a metal doughnut shape and includes an inner periphery edge portion for holding the seat, an intermediate annular portion formed with a plurality of through holes communicating with the fluid outlet channel arranged at predetermined intervals, and a outer peripheral edge portion configured to clamp the outer peripheral edge portion of the diaphragm.

By using the seat holder unit for a diaphragm valve of the present invention, in the case of replacing the seat of the diaphragm valve, the seat holder held by the retainer and the seat held thereby may be demounted by demounting the retainer, so that the replacement of the seat may be achieved easily. In particular, when the seat holder is plastically deformed and if the retainer is not provided, the seat holder can hardly be demounted. However, by demounting the seat holder together with the retainer, such a problem is solved.

Preferably, a bent portion configured to be resiliently deformable in the radial direction is formed on an upper end portion of a peripheral wall of the retainer.

In this configuration, mounting of the seat holder unit for a diaphragm valve to the diaphragm valve is facilitated, and the dropping out of the diaphragm valve can reliably be prevented.

Preferably, the peripheral wall of the retainer is divided into four or more arcuate portions by providing a plurality of slits extending in the axial direction, and the bent portion is formed into two or more arcuate portions.

In this configuration, the resilient deformation of the bent portion is increased, and easiness of mounting and reliability of prevention of dropping out may further be enhanced.

In this specification, the direction of an axis of the diaphragm (the direction of resilient deformation) is referred to as the vertical direction, this direction is only for the convenience, and the vertical direction may not be only the perpendicular direction, but also the horizontal direction for actual mounting.

Advantageous Effect of the Invention

According to the diaphragm valve of the present invention, the retainer configured to hold the seat holder is further provided, and the retainer is demountably mounted on the diaphragm holding member in a state in which the seat holder is held. Therefore, in the case of replacement of the seat, the seat holder held by the retainer and the seat held thereby may be demounted by demounting the retainer, so that the replacement of the seat may be achieved easily. In addition, in comparison with the seat holder subjected to plastic deformation because of a configuration to clamp the outer peripheral edge portion of the diaphragm, the retainer has little probability of plastic deformation, so that easiness of displacement of the seat is maintained for a long time. In addition, when using the retainer, the positional relationship between axial centers of the members to be fixed or the members themselves may be kept maintained by the retainer, and hence assembly work without necessity of fine adjustment or the like is possible.

According to the seat holder unit for a diaphragm valve of the present invention, the seat holder unit is composed of the seat holder configured to hold the seat arranged on the peripheral edge of the fluid channel formed in the body and the substantially cylindrical retainer having the inward flange portion for receiving the outer peripheral portion of the seat holder, and hence when replacing the seat, the seat holder held by the retainer and the seat held thereby may be demounted by demounting the seat holder unit, so that the replacement of the seat may be achieved easily. In addition, in comparison with the seat holder subjected to plastic deformation because of a configuration to clamp the outer peripheral edge portion of the diaphragm, the retainer has little probability of the plastic deformation, so that easiness of displacement of the seat is maintained for a long time by the use of the seat holder unit.

REFERENCE SIGNS LIST (1): diaphragm valve, (2): body, (2a): fluid inlet channel, (2b): fluid outlet channel, (4): seat, (5): seat holder, (6): diaphragm, (8): diaphragm holder, (10): guide cylinder (diaphragm holding member), (11): diaphragm holder ring (diaphragm holding member), (12): retainer, (31): peripheral wall, (32): inward flange portion, (33): slit, (34): large arcuate portion, (35): small arcuate portion, (36): bent portion

DESCRIPTION OF EMBODIMENTS

Embodiments of the present invention will be described with reference to the drawings below.

Figure 1:
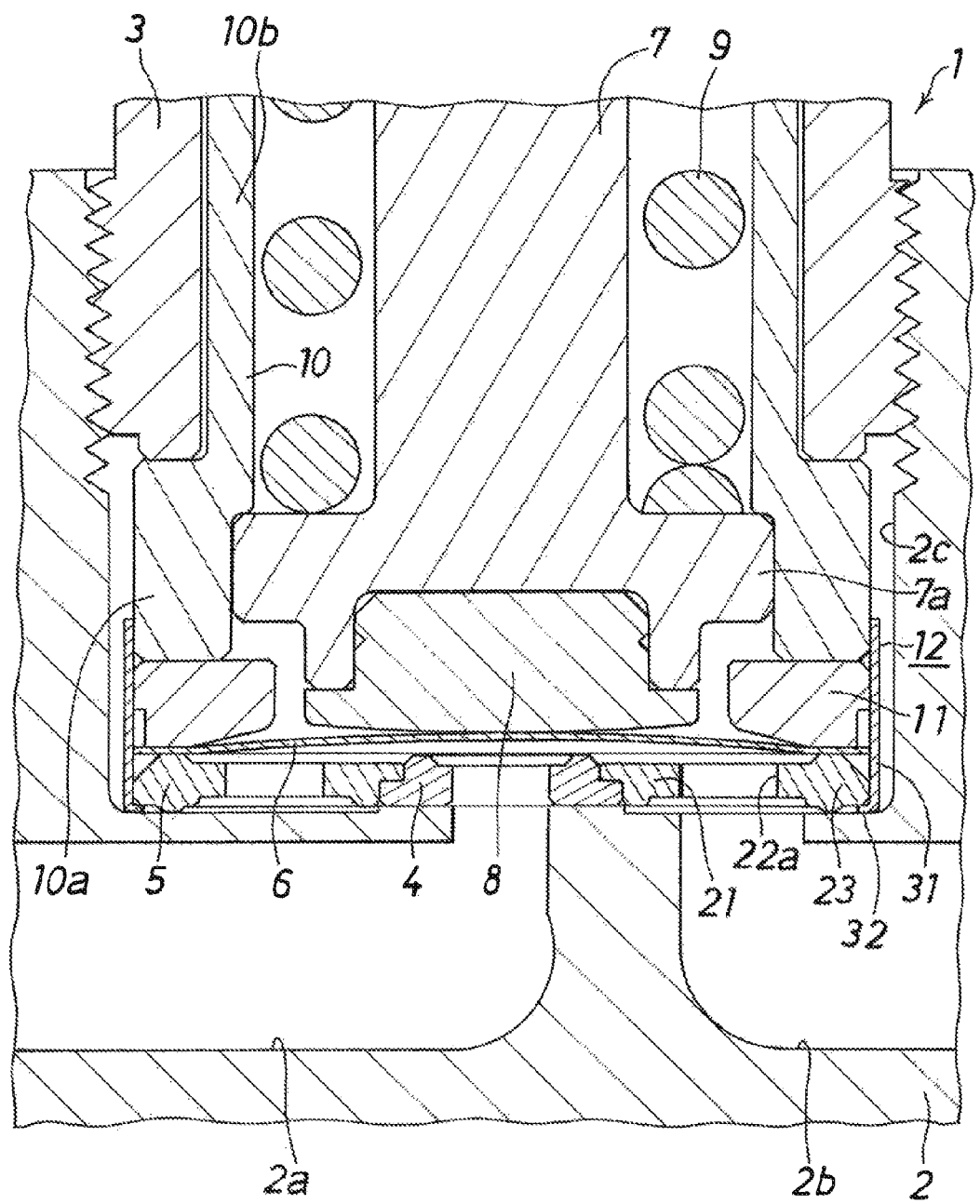
FIG. 1 is a vertical cross-sectional view illustrating a first embodiment of a diaphragm valve and a seat holder unit for a diaphragm valve of the invention.

FIG. 1 illustrates a first embodiment of a diaphragm valve according to the invention, and a diaphragm valve (1) includes a block-shaped body (2) including a fluid inlet channel (2a), a fluid outlet channel (2b), and a depression (2c) opening upward, a cylindrical bonnet (3) a lower end portion of which is screwed to an upper portion of the depression (2c) of the body (2) and extending upward, an annular seat (4) provided on an peripheral edge of the fluid inlet channel (2a), a seat holder (5) provided on an outer periphery of the seat (4) in the body (2) and holding the seat (4), a diaphragm (6) configured to open and close the fluid inlet channel (2a) by being pressed against or moved away from the seat (4), a stem (7) having a diaphragm holder (8) configured to hold a center portion of the diaphragm (6) at a lower end thereof, inserted into the bonnet (3) so as to be capable of moving upward and downward to move the diaphragm (6) to be pressed against and away from the seat (4) via the diaphragm holder (8), a compression coil spring (urging member) (9) configured to urge the stem (7) downward, a guide cylinder (10) arranged in the inner periphery of the bonnet (3) and configured to guide the upward and downward movement of the stem (7) and simultaneously to restrict a range of movement of the stem (7), a diaphragm holder ring (11) arranged between an upper surface of an outer peripheral edge portion of the diaphragm (6) and a lower end of the guide cylinder (10) and configured to clamp the outer peripheral edge portion of the diaphragm (6) with an outer peripheral portion of the seat holder (5), and a vertically moving device (not illustrated) configured to transfer the stem (7) and the diaphragm holder (8) upward and downward with compression air in order to open and close the fluid inlet channel (2a).

The guide cylinder (10) includes a thick portion (10a) and a thin portion (10b) continuing upward therefrom. The inner periphery of the thick portion (10a) is larger in diameter than the inner periphery of the thin portion (10b), and the outer periphery of the flange portion (7a) provided on the stem (7) is guided by the inner periphery of the thick portion (10a). The outer periphery of the thick portion (10a) is larger in diameter than the outer periphery of the thin portion (10b), and the lower end surface of the bonnet (3) is received by an upper surface of the thick portion (10a) (a level difference between the thick portion (10a) and the thin portion (10b)). Therefore, the guide cylinder (10) presses the diaphragm holder ring (11) downward by the bonnet (3) screwed into the body (2). In this manner, the guide cylinder (10) is a member not only for guiding the stem (7), but also for fixing the diaphragm holder ring (11) to the body (2), and a combination of the guide cylinder (10) and the diaphragm holder ring (11) constitute a diaphragm holding member configured to clamp the outer peripheral edge portion of the diaphragm (6) with the seat holder (5).

The above-described configuration is basically a known configuration, and the diaphragm valve (1) according to the present invention further includes a retainer (12) configured to hold the seat holder (5) in addition to the configuration described above and demountably mounted to a lower end portion of the guide cylinder (10) and the diaphragm holder ring (diaphragm holding member) (11).

The seat holder (5) and the retainer (12) constitute a seat holder unit for a diaphragm valve on the present invention.

Figure 2:
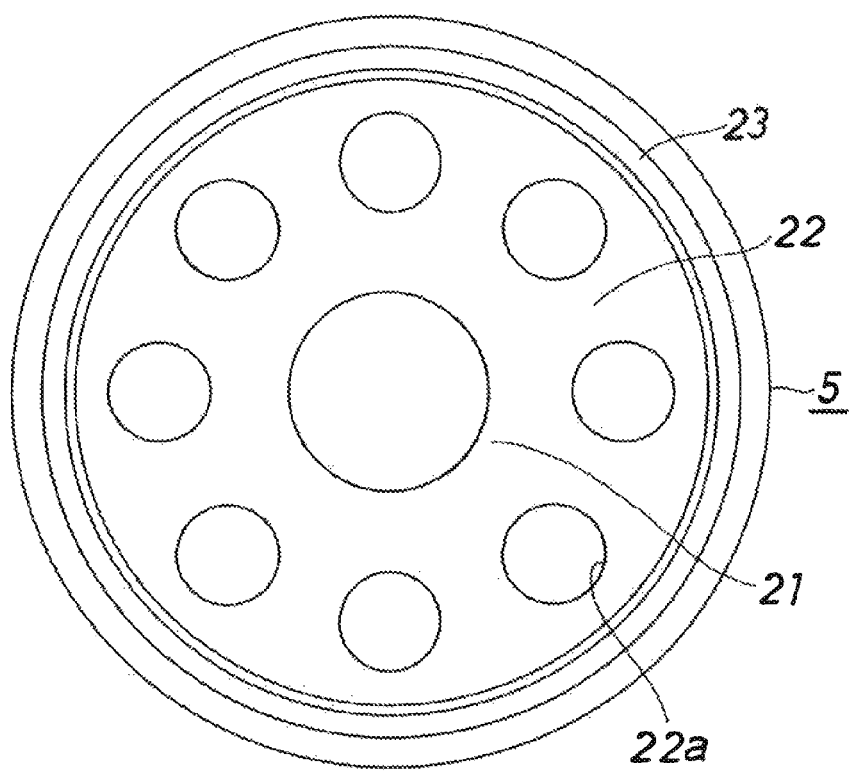
FIG. 2 is an enlarged view illustrating the seat holder which constitutes the seat holder unit for a diaphragm valve, in which (a) is a plan view, and (b) is a vertical cross-sectional view.
Figure 2:
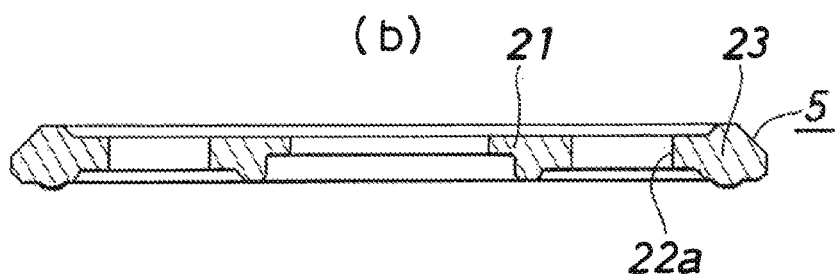

The seat holder (5) is a metal doughnut shape and, as illustrated in FIG. 2 in detail, includes an inner periphery edge portion (21) for holding the seat (4), an intermediate annular portion (22) formed with a plurality of through holes (22b) communicating with the fluid outlet channel (2b) arranged at predetermined intervals, and an outer peripheral edge portion (23) configured to clamp the outer peripheral edge portion of the diaphragm (6). The seat (4) is fitted to the seat holder (5) from below.

Figure 3:
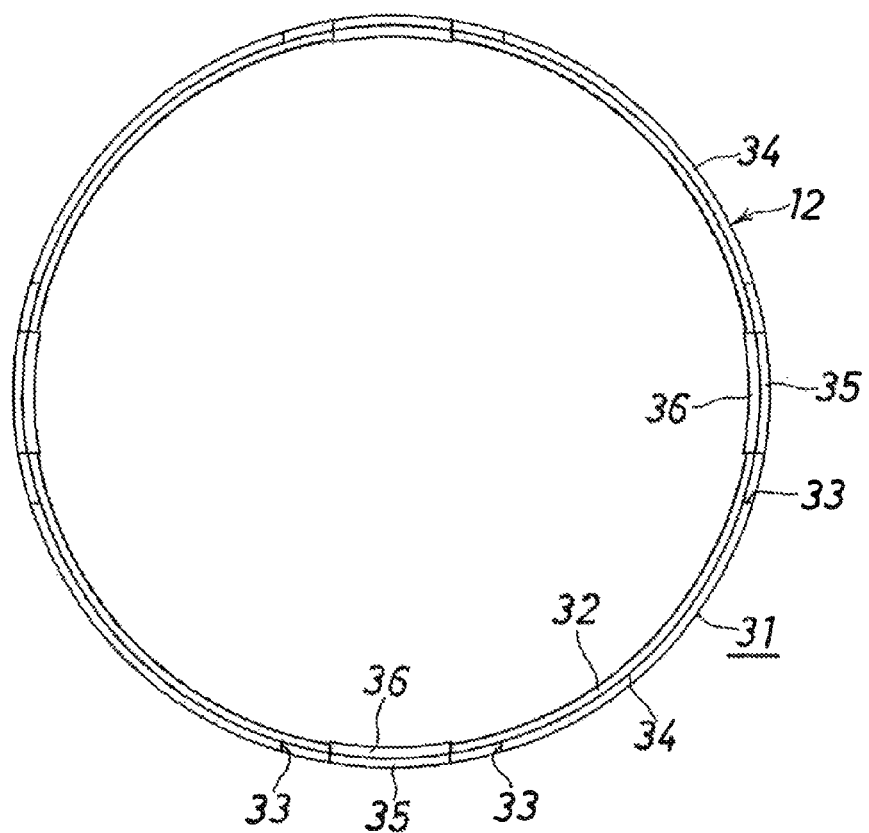
FIG. 3 is an enlarged view illustrating a retainer which constitutes the seat holder unit for a diaphragm valve, in which (a) is a plan view, and (b) is a vertical cross-sectional view.
Figure 3:
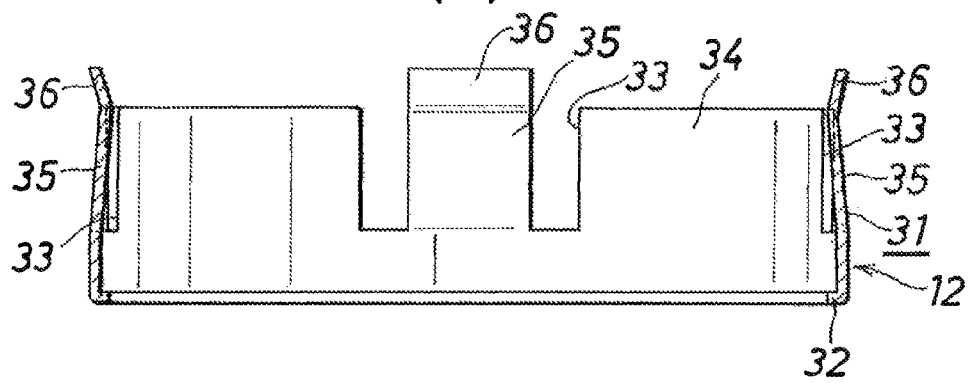

As illustrated in FIG. 3 in detail, the retainer (12) has a substantially cylindrical shape, includes a peripheral wall (31) having an inner diameter substantially the same as the outer diameter of the seat (4) and to be fitted to the outer periphery of the lower end portion of the guide cylinder (10) and the diaphragm holder ring (diaphragm holding member) (11), and an inward flange portion (32) provided at a lower end portion of the peripheral wall (31) receiving the outer peripheral edge portion of the seat holder (5). The peripheral wall (31) is provided with four pairs of slit (33) extending in the axial direction, whereby the peripheral wall (31) is divided into four large arcuate portions (34) and four small arcuate portions (35). A bent portion (36) which has an upper end surface positioned above the upper end of the large arcuate portion (34), and is bent radially inward and resiliently deformable, is formed at an upper end portion of the small arcuate portion (35). The minimum inner diameter of the bent portion (36) is smaller than the outer diameter of the diaphragm holder ring (11) in a free state, thereby being capable of stably holding the diaphragm holder ring (11).

The bent portion (36) has sufficient resilient deformability and does not have to have the upper end surface positioned above the upper end of the large arcuate portion (34) as long as being capable of holding the lower end portion of the guide cylinder (10) or the diaphragm holder ring (11). The thickness of the inward flange portion (32) only needs to have a thickness which allows the lower end portion of the seat holder (5) to come into contact with a bottom surface of the depression (2c) when the seat holder (5) is pressed by the bottom surface of the depression (2c) of the body (2) by the bonnet (3) or the like. Alternatively, a configuration in which a resilient member (not illustrated) configured to urge the seat holder (5) upward is provided in the interior of the inward flange portion (32) so as to prevent the lower end portion of the seat holder (5) from protruding from the inward flange portion (32) in a state in which the retainer (12) is held by the lower end portion of the guide cylinder (10) and, when being fixed to the depression (2c) of the body (2), to cause the seat holder (5) to be pressed against the urging force of the resilient member, and allow the lower end portion of the seat holder (5) to be protruded more than the inward flange portion (32) and to come into contact with the bottom surface of the depression (2c). In this configuration, since the lower end portion of the seat holder (5) is held in the inward flange portion (32) until being fixed to the body (2), the probability that the lower end portion the seat holder (5) is scarred may be reduced, so that leakage of the fluid from the seat (4) due to the scarring is prevented. What is essential is just to hold the retainer (12) on the lower end portion of the guide cylinder (10) or the diaphragm holder ring (11), and hence the retainer (12) can be held on the lower end portion of the guide cylinder (10), for example, by forming the retainer (12) into a cylindrical shape without a slit, or into a cylindrical shape with a slit and a tapered outer periphery of the guide cylinder (10) even without providing the large arcuate portion (34) and the bent portion (36) on the retainer (12) for causing the resilient deformation.

The seat (4) is held in the seat holder unit for a diaphragm valve composed of the seat holder (5) and the retainer (12) and is arranged in the body (2). The seat (4) is configured normally to be replaced when used for a certain period, and when replacing the seat (4), the seat holder (5), and the seat (4) held thereby can be demounted by demounting the retainer (12). Subsequently, the seat (4) is replaced, and if necessary, the seat holder (5) is replaced as well, and the seat holder unit for a diaphragm valve composed of the seat holder (5) and the retainer (12) is returned back to the interior of the body (2) in a state in which the seat (4) is held therein. In this manner, replacement of the seat (4) can be performed easily. The retainer (12) has little probability of being subjected to a plastic deformation, and hence can generally be used repeatedly, and easiness of replacement of the seat (4) can be maintained for a long time owing to little probability of plastic deformation.

INDUSTRIAL AVAILABILITY

Since the diaphragm valve which allows easy replacement of the seat is provided, the present invention contributes to improvement of performance of the diaphragm valve used widely for opening and closing the fluid channel.

The invention claimed is:
1. A diaphragm valve including:
   a body provided with a fluid channel;
   a seat arranged on a peripheral edge of the fluid channel formed on the body;
   a seat holder demountably arranged on the body and configured to hold the seat;
   a diaphragm configured to open and close the fluid channel by being pressed against or moved away from the seat;
   a diaphragm holding member configured to clamp an outer peripheral edge portion of the diaphragm with the seat holder;
   a vertical moving device configured to move a diaphragm holder, the diaphragm holder configured to hold a center portion of the diaphragm, and the vertical moving device configured to move the diaphragm upward and downward; and
   a retainer configured to hold the seat holder, and thereby form a seat holder unit, wherein the retainer is demountably mounted on the diaphragm holding member in a state of holding the seat holder, and wherein the seat holder unit is adapted to be demounted from the diaphragm holding member along with the seat.

2. The seat holder unit for a diaphragm valve according to claim 1, characterized in that a bent portion configured to be resiliently deformable in the radial direction is formed on an upper end portion of a peripheral wall of the retainer.

3. The seat holder unit for a diaphragm valve according to claim 1, characterized in that the peripheral wall of the retainer is divided into four or more arcuate portions by a plurality of slits extending in the axial direction, and the bent portion is formed into two or more arcuate portions.

4. The seat holder unit for a diaphragm valve according to claim 2, characterized in that the peripheral wall of the retainer is divided into four or more arcuate portions by a plurality of slits extending in the axial direction, and the bent portion is formed into two or more arcuate portions.

* * * * *

UNITED STATES PATENT AND TRADEMARK OFFICE
CERTIFICATE OF CORRECTION

| | | |
|---|---|---|
| PATENT NO. | : 9,285,042 B2 | |
| APPLICATION NO. | : 14/130064 | |
| DATED | : March 15, 2016 | |
| INVENTOR(S) | : Taichi Kitano et al. | |

It is certified that error appears in the above-identified patent and that said Letters Patent is hereby corrected as shown below:

In the Claims:

At column 7, claim number 2, line number 1, delete "seat holder unit for a" before "diaphragm valve according to"

At column 7, claim number 3, line number 5, delete "seat holder unit for a" before "diaphragm valve according to"

At column 7, claim number 4, line number 10, delete "seat holder unit for a" before "diaphragm valve according to"

Signed and Sealed this
Nineteenth Day of July, 2016

Michelle K. Lee
*Director of the United States Patent and Trademark Office*